(No Model.)
J. LONGINUS.
LUBRICATOR.
No. 517,467.  Patented Apr. 3, 1894.
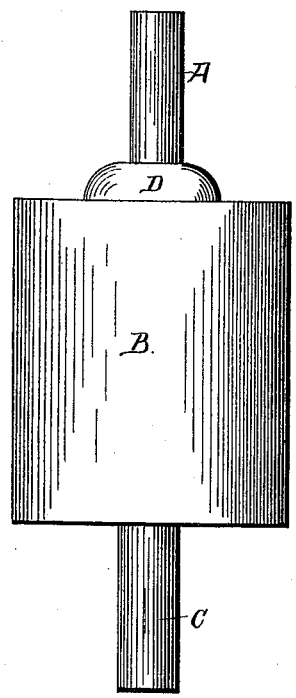
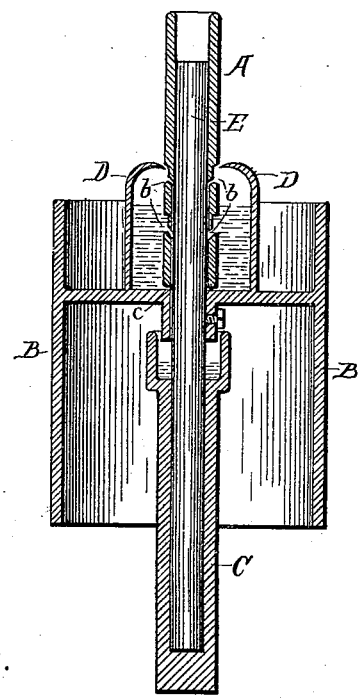
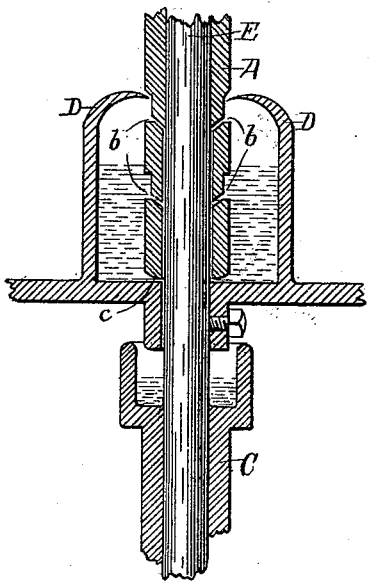
Witnesses
A. Lewis Bowen
Inventor
Joseph Longinus.
by J. M. Hale his
Attorney

UNITED STATES PATENT OFFICE.

JOSEPH LONGINUS, OF POTTSVILLE, PENNSYLVANIA, ASSIGNOR OF ONE-HALF TO MARTHA P. QUINN, OF SAME PLACE.

LUBRICATOR.

SPECIFICATION forming part of Letters Patent No. 517,467, dated April 3, 1894.

Application filed December 4, 1893. Serial No. 492,680. (No model.)

*To all whom it may concern:*

Be it known that I, JOSEPH LONGINUS, of Pottsville, in the county of Schuylkill and State of Pennsylvania, have invented certain new and useful Improvements in Lubricators, of which the following is a full, clear, and exact description.

My invention relates to improvements in lubricators for oiling mule or upright shafting, whereby the oil is fed from a cup or receiver of novel design and operation continuously upon the shaft through perforations in the bearings so that all the oil in the receiver is utilized, and none of it is thrown off upon the pulley or belt, thus securing economy in the use of oil and in belts and the general operation of the machines on which it is used, by the avoidance of frequent filling of oil cups, stoppages from slipping of belts and other contingencies happening from the scattering of the oil upon the exposed parts of the machinery not intended to be oiled.

Reference is to be had to the accompanying drawings, forming a part of this specification, in which similar letters of reference indicate corresponding parts in all the figures.

Figure 1 is a perpendicular elevation of a shaft and pulley showing an outside view of the top elevation of my lubricator. Fig. 2 is a sectional view of lubricator showing its attachment to the shaft and pulley. Fig. 3 is an enlarged sectional view of the same, showing the lubricator in operation within the pulley, and the perforations in the bearing for the introduction of the oil, and the bottom bearing of the shaft with its upper part formed into a cup to receive the drip or surplus oil, preventing it being thrown off on the pulley or belt, and holding it for the lubrication of the loose part of the shaft.

D D is a cylindrical cup, attached at its base to the pulley hub B B, having its upper walls turned inward, and provided with openings at the top and bottom, to receive the shaft and upper bearing A. The upper bearing A in which the shaft E revolves is provided with a series of angular perforations b b of sufficient diameter to admit of oil entering freely and discharging against the shaft. When in operation the oil, being placed in the cup formed by the elevation of the top bearing A above the shaft, passes downward over the shaft and enters the cup D at the bottom of the bearing A through the orifice between it and the hub of the pulley. The centrifugal motion of the shaft forces this oil against the walls of the cup D D, and passes it along these walls upward to the concave lips of the cup which will throw it against the bearing inside the cup. The oil falling downward passes along the sides of the bearing and into the angular perforations b b, when it falls upon the shaft E, and descending to the opening at the bottom of the bearing inside of the cup, passes again into the cup and follows the same course, continuing in revolution until the shafting is stopped. When this occurs, the oil in the cup D D finds a vent through a slot c, milled into the shaft E and drops into a drip cup formed by extending the sides of the bottom bearing C, and serves as a lubricant for the bottom bearing.

Having thus fully described my invention, what I deem as new, and desire to secure by Letters Patent, is—

As an improved article of manufacture, a lubricator for mule or upright shafting, consisting of a cylindrical hollow cup, D D, with inverted top, provided with an opening at top and bottom to admit the shaft and bearing passing readily through it, in combination with the bearing A, perforated with angular vents b b, substantially as described and herein set forth.

JOS. LONGINUS.

Witnesses:
W. R. COLE,
CHAS. H. WÖLTJEN.

It is hereby certified that the name of the assignee in Letters Patent No. 517,467, granted April 3, 1894, upon the application of Joseph Longinus, of Pottsville, Pennsylvania, for an improvement in "Lubricators," was erroneously written and printed "Martha P. Quinn," whereas said name should have been written and printed *Murtha P. Quinn;* and that the said Letters Patent should be read with this correction therein that the same may conform to the corrected files and records of the case in the Patent Office.

Signed, countersigned, and sealed this 10th day of April, A. D. 1894.

[SEAL.]

JNO. M. REYNOLDS,
*Assistant Secretary of the Interior.*

Countersigned:

S. T. FISHER.
*Acting Commissioner of Patents.*